(12) United States Patent
Hirai (10) Patent No.: US 7,014,228 B2
(45) Date of Patent: Mar. 21, 2006

(54) DOOR CLOSER FOR VEHICLE (75) Inventor: Makoto Hirai, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/653,947

(22) Filed: Sep. 4, 2003

(65) Prior Publication Data
US 2004/0046409 A1 Mar. 11, 2004

(30) Foreign Application Priority Data
Sep. 6, 2002 (JP) ............................. 2002-261917

(51) Int. Cl.
E05B 15/02 (2006.01)
(52) U.S. Cl. ............ 292/341.16; 292/201; 292/341.15; 292/341.17; 292/DIG. 43; 49/280
(58) Field of Classification Search .......... 292/341.16, 292/201, 341.15, 341.17, DIG. 43; 49/280
See application file for complete search history.

(56) References Cited

U.S. PATENT DOCUMENTS

| 3,403,934 | A | * | 10/1968 | Butts ...................... 292/341.16 |
| 4,707,007 | A | * | 11/1987 | Inoh ...................... 292/341.16 |
| 4,739,585 | A | * | 4/1988 | Pickles ......................... 49/280 |
| 4,746,153 | A | * | 5/1988 | Compeau et al. ........... 292/216 |
| 4,842,313 | A | * | 6/1989 | Boyko et al. .......... 292/341.16 |
| 4,889,371 | A | * | 12/1989 | Girard et al. ............... 292/201 |
| 4,968,073 | A | * | 11/1990 | Kuhlman ..................... 292/201 |
| 4,982,984 | A | * | 1/1991 | Yokota et al. .............. 292/201 |
| 4,998,049 | A | * | 3/1991 | Chapman .................... 318/280 |
| 5,273,325 | A | * | 12/1993 | Zimmermann .............. 292/216 |
| 5,429,400 | A | * | 7/1995 | Kawaguchi et al. ......... 292/201 |
| 5,765,886 | A | * | 6/1998 | Buchanan, Jr. ........ 292/341.16 |
| 5,785,364 | A | * | 7/1998 | Kleefeldt et al. ........... 292/201 |
| 5,938,254 | A | * | 8/1999 | Weyerstall ............. 292/341.16 |
| 6,773,043 | B1 | * | 8/2004 | Taga ..................... 292/341.16 |

FOREIGN PATENT DOCUMENTS

| JP | 2000-8675 A | 1/2000 |
| JP | 2002-21396 A | 1/2002 |

* cited by examiner

Primary Examiner—Brian E. Glessner
Assistant Examiner—Carlos Lugo
(74) Attorney, Agent, or Firm—Sughrue Mion, PLLC (57) ABSTRACT A door closer includes a striker, a latch mechanism, and an actuator that brings the striker into a standby position when the actuator performs a standby action and, brings the striker into a closed position when the actuator performs a closing operation. After the striker is located at the standby position and engaged with the latch mechanism, the striker is moved to the closed position, thereby closing the trunk lid with respect to the vehicle body. Between the actuator and the striker, the striker is held at the standby position when the actuator performs the standby action in a normal state. When a switching operation is performed, the striker is allowed to move to the closed position even when the actuator 30 performs the standby action.

2 Claims, 7 Drawing Sheets

DOOR CLOSER FOR VEHICLE

BACKGROUND OF THE INVENTION

1) Field of the Invention

The present invention relates to a door closer that gently pulls a door of a vehicle when closing the door.

2) Description of the Related Art

In general, a trunk lid that is a door of a vehicle can be put in a fully closed state by allowing a latch mechanism provided on the trunk lid to be engaged with a striker. However, since a weather strip is mounted on a rim of a trunk room opening of the vehicle body, in order to close the trunk lid, it is necessary to strongly push down the trunk lid to overcome a reaction force of the weather strip. Therefore, the vehicle body is largely vibrated, which gives a passenger an unpleasant feeling.

To cope with the problem, a closer, which engages the latch mechanism with the striker before the closing trunk lid is fully closed, and then, pulls the trunk lid to establish the fully closed state, is proposed. In this closer, an actuator drives the striker so that the striker can move from a standby position to the closed position along a closing direction of the trunk lid. After the striker located in the standby position is engaged with the latch mechanism, if the striker is moved to the closed position, the trunk lid is pulled and fully closed. The conventional closer has been disclosed in, for example, Japanese Patent Application Laid-open Publication No. 2002-21396 and Japanese Patent Application Laid-open Publication No. 2000-8675.

In such a closer, however, when the actuator that moves the striker from the standby position to the closed position becomes out of order, trunk lid cannot be fully closed. Especially when the actuator trouble occurs as the striker is in the standby position, the striker cannot be moved to the closed position, even if the striker is engaged with the latch mechanism of the closing trunk lid. In this case, raindrops or the like may be leaked into the trunk room.

SUMMARY OF THE INVENTION

It is an object of the present invention to solve at least the problems in the conventional technology.

The door closer for a vehicle according to the present invention includes a striker provided on one of a body and a door of the vehicle, a latch mechanism provided on other of the body and the door, a driving unit, and a switching unit that is provided between the driving unit and the striker. The driving unit performs a standby action to locate the striker at a standby position, and when the striker is engaged with the latch mechanism, performs a closing action to move the striker to a closed position, thereby closing the door. The switching unit holds the striker at the standby position when the driving unit performs the standby action in a normal state, and with a switching operation performed, the switching unit allows the striker to move to the closed position even when the driving unit performs the standby action.

The other objects, features and advantages of the present invention are specifically set forth in or will become apparent from the following detailed descriptions of the invention when read in conjunction with the accompanying drawings.

DETAILED DESCRIPTION

Figure 1:
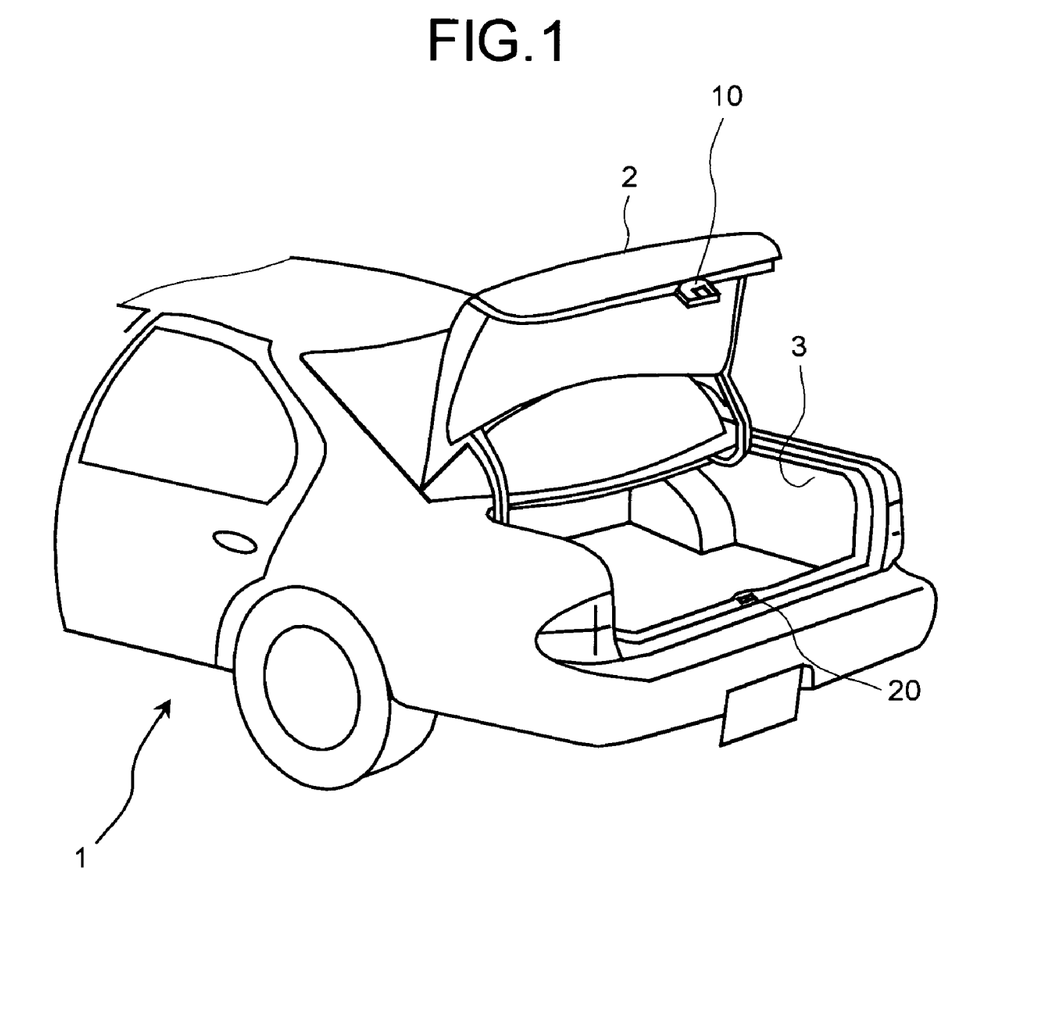
FIG. 1 is a schematic diagram illustrating a mounting state of a closer of a trunk lid according to an embodiment of the present invention.

Exemplary embodiments of a door closer according to the present invention are explained in detail with reference to the accompanying drawings. The embodiment takes a trunk lid of a vehicle as one example of the door. FIG. 1 is a schematic diagram illustrating a mounting state of a closer of a trunk lid according to an embodiment of the present invention.

A latch mechanism 10 is provided on a center portion of a rear rim of a trunk lid 2 of a vehicle 1. A weather strip, which is not shown in the figure, is mounted on a rim of a trunk room opening 3. A closer 20 is mounted on the rim of the trunk room opening 3 corresponding to the latch mechanism 10.

Figure 2:
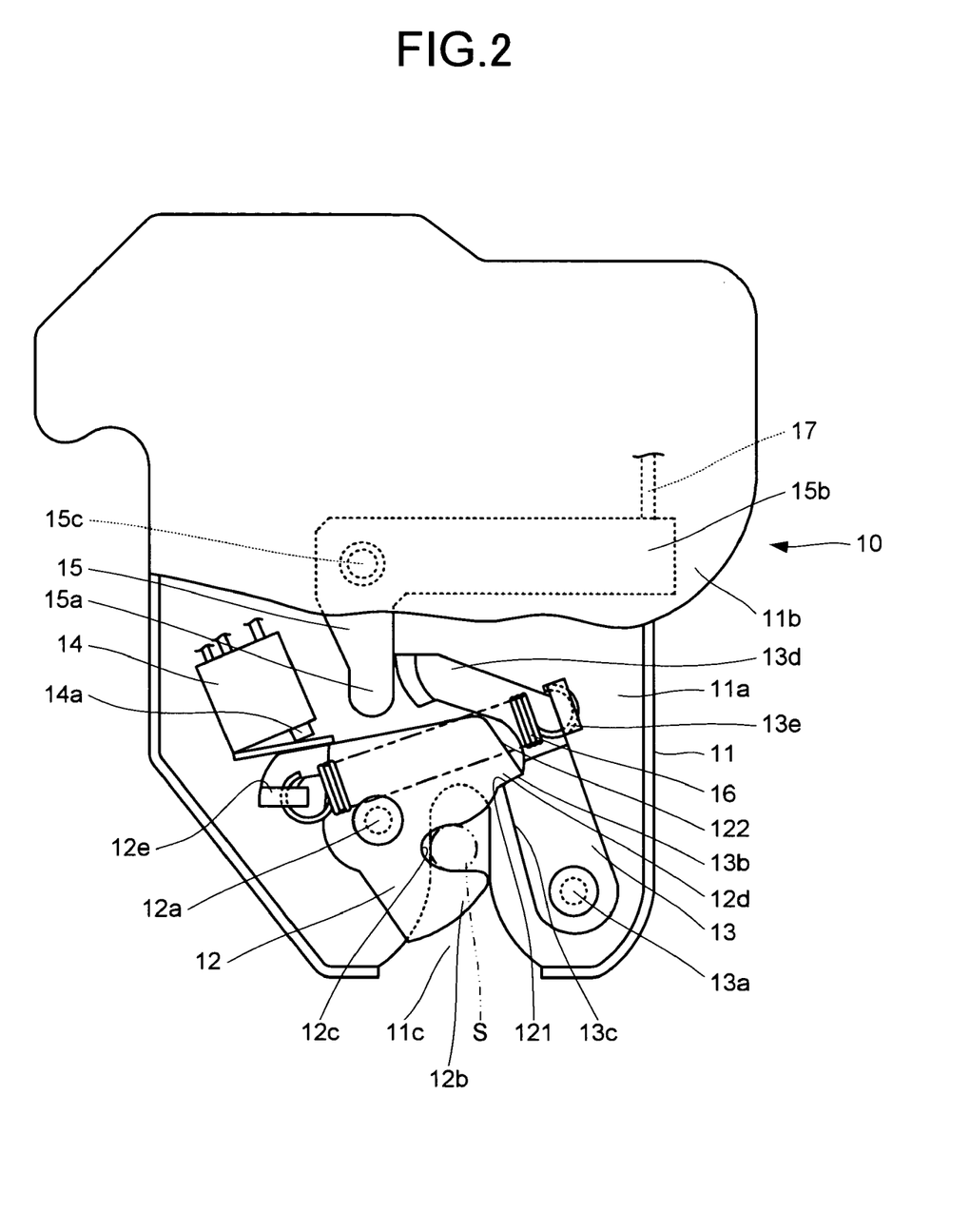
FIG. 2 is a schematic diagram of a latch mechanism in a closed state.
Figure 3:
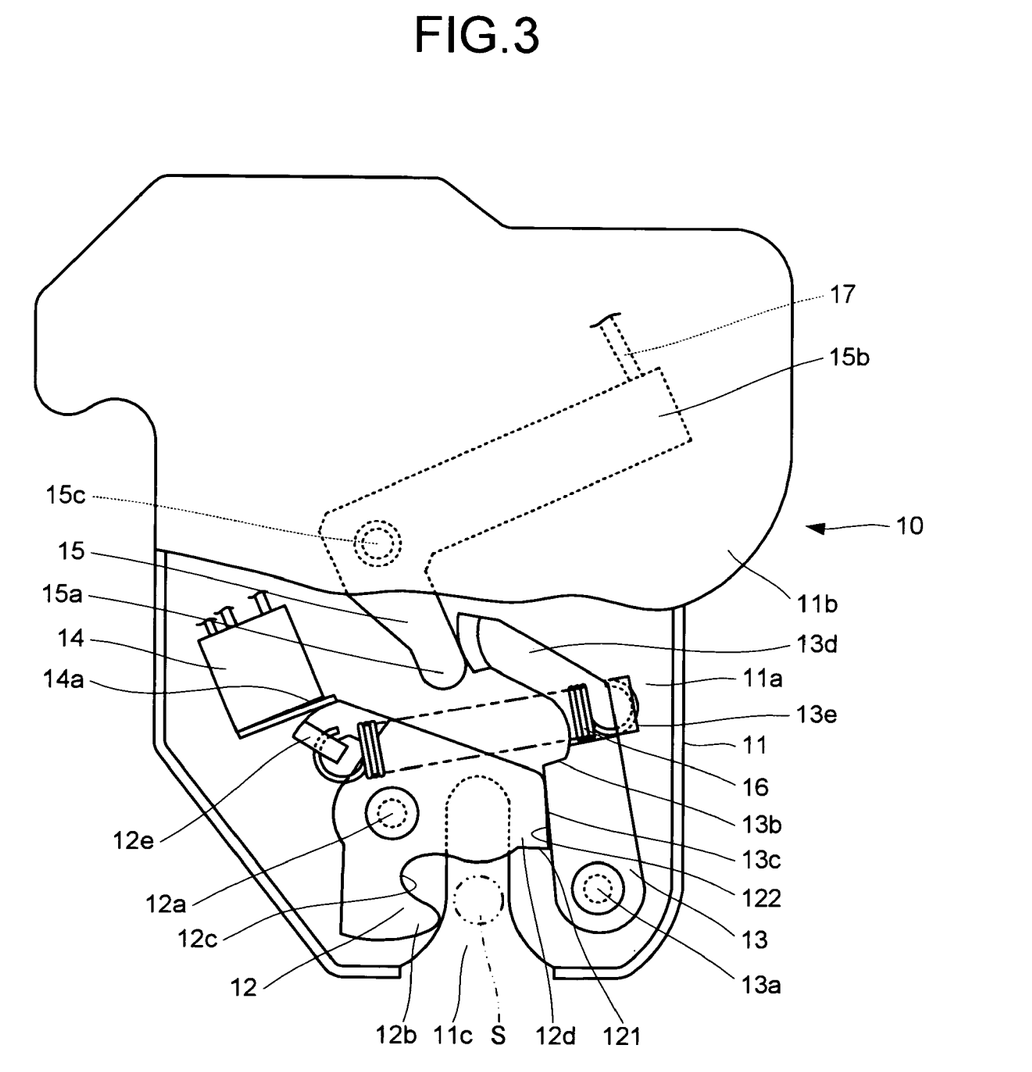
FIG. 3 is a schematic diagram of the latch mechanism in an opened state.

FIG. 2 and FIG. 3 are schematic diagrams of the latch mechanism 10 in a closed state and an opened stated, respectively. FIG. 2 and FIG. 3 also illustrate a portion of an internal structure of the latch mechanism 10 with a dotted line.

The latch mechanism 10 includes a latch 12, a ratchet 13, a switch 14 and a release-lever 15 in a latch mechanism body 11.

The latch mechanism body 11 includes a base plate 11a and a cover plate 11b. A lower center portion of the latch mechanism body 11 is formed with a striker-entering groove 11c into which a striker S constituting the closer 20 enters.

The latch 12 is supported at the base plate 11a by a latch shaft member 12a, and the latch 12 can swing around an axis of the latch shaft member 12a. The latch 12 comprises a hook-like tip end 12b, a recessed holding section 12c, a latch-contact section 12d which comes into contact with the ratchet 13, and a latch-engaging piece 12e projecting toward a front direction at an opposite position from the tip end 12b across the latch shaft member 12a. If the latch 12 swings, the tip end 12b advances to close the striker-entering groove 11c (see FIG. 2) or retracts to open the striker-entering groove 11c (see FIG. 3)

The ratchet 13 is supported at the base plate 11a through the base end by its ratchet shaft member 13a, and the ratchet 13 can swing around an axis of the ratchet shaft member 13a. The ratchet 13 extends from the ratchet shaft member 13a in an upper left direction. The ratchet 13 is provided at its tip end with a trigger section 13d. A ratchet-engaging section 13b and a ratchet-contact section 13c are provided between the trigger section 13d and the ratchet shaft member 13a on the side of the latch 12. A ratchet-engaging piece 13e projecting toward the front direction is provided on a portion of the ratchet 13 slightly closer to its tip end than the ratchet-engaging section 13b.

A latch-extension coil spring 16 extends between the latch-engaging piece 12e of the latch 12 and the ratchet-engaging piece 13e of the ratchet 13. The latch 12 is biased in a clockwise direction around an axis of the latch shaft member 12a. The ratchet 13 is biased in a counterclockwise direction around an axis of the ratchet shaft member 13a. That is, the latch 12 and the ratchet 13 are biased in a direction that they abut on each other.

The switch 14 detects whether the tip end 12b of the latch 12 advances to close the striker-entering groove 11c or retracts to open the striker-entering groove 11c. More specifically, if a push-button 14a provided on the switch 14 is not pushed by the latch 12, the switch 14 detects that the striker-entering groove 11c is closed, and if the push-button 14a is pushed by the latch 12, the switch 14 detects that the striker-entering groove 11c is opened.

The release-lever 15 is supported by the base plate 11a such that the release-lever 15 can be pivoted by a release-lever shaft member 15c. The release-lever 15 comprises a tip end 15a extending downward from the release-lever shaft member 15c, and a base end 15b extending rightward as viewed in the drawing from the release-lever shaft member 15c, and the release-lever 15 is formed into substantially L-shape. The trigger section 13d of the ratchet 13 abuts on the tip end 15a, and a wire 17 extending from an operating section is fixed to the base end 15b.

Figure 4A:
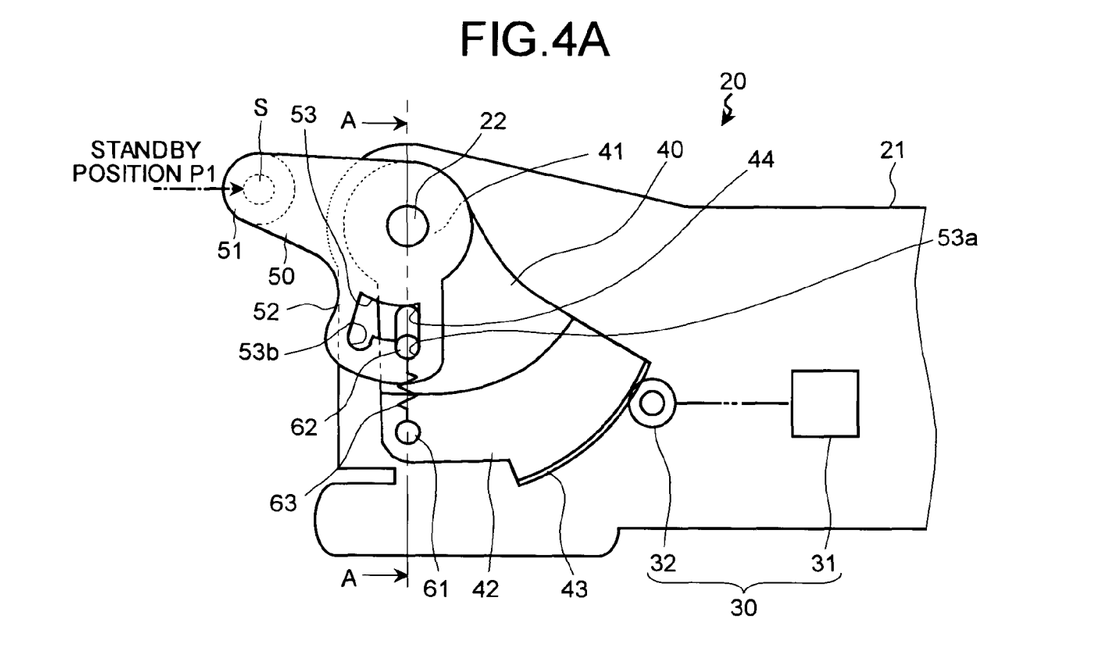
FIG. 4A is a schematic diagram of a closer according to the embodiment.
Figure 4B:
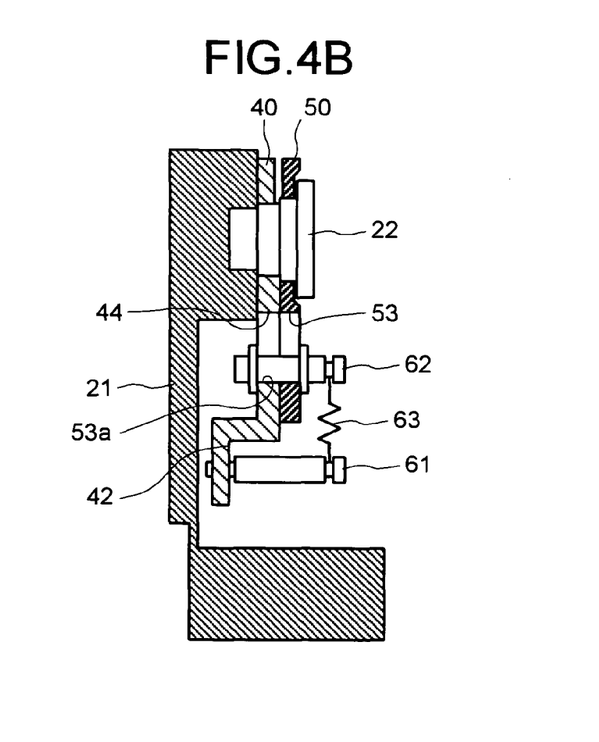
FIG. 4B is a cross section of the closer cut along a line A—A in FIG. 4A.

FIG. 4A is a schematic diagram of a closer according to the embodiment, and FIG. 4B is a cross section of the closer cut along a line A—A in FIG. 4A. The closer 20 comprises an actuator 30, a transmitting lever 40, and a striker-holding lever 50.

The actuator 30 is a driving unit of the closer 20, and comprises a motor 31 as a driving power source, and a gear 32 which is rotated by the motor 31. The motor 31 and the gear 32 are fixed to and supported by the base member 21.

The transmitting lever 40 is supported at its upper end 41 by the base member 21 by means of the lever-shaft member 22, and the transmitting lever 40 can swing around an axis of the lever-shaft member 22. As shown in FIG. 4B, a lower end of the transmitting lever 40 is formed as a bent portion 42 that is bent in a rear direction (arrangement direction of the base member 21). The bent portion 42 is formed with a engaging portion 43 that is engaged with the gear 32. Therefore, the transmitting lever 40 swings around the axis of the lever-shaft member 22 as the gear 32 rotates.

A fixing and connecting pin 61 projects from the bent portion 42 of the transmitting lever 40 toward the front direction, and a long engaging hole 44 is formed in the transmitting lever 40 above the fixing and connecting pin 61.

The striker-holding lever 50 is supported by the base member 21 by means of the lever-shaft member 22 such that the striker-holding lever 50 can swing around the axis of the lever-shaft member 22. As is apparent from FIG. 4A and FIG. 4B, the striker-holding lever 50 is provided closer to the front direction than the transmitting lever 40. The striker S is held by a tip end 51 of the striker-holding lever 50. A base end 52 of the striker-holding lever 50 is formed with a positioning hole 53 at a location corresponding to the engaging hole 44 of the transmitting lever 40. A first recess 53a and a second recess 53b are formed below the positioning hole 53.

As shown in FIG. 4B, a moving and connecting pin 62 is inserted through the engaging hole 44 of the transmitting lever 40 and the positioning hole 53 of the striker-holding lever 50. The moving and connecting pin 62 is connected to the fixing and connecting pin 61 through a connection-extension coil spring 63. Therefore, the moving and connecting pin 62 is biased in a direction opposite to the fixing and connecting pin 61 by the connection-extension coil spring 63, and the moving and connecting pin 62 engages with the first recess 53a of the positioning hole 53 and a lower portion of the engaging hole 44. In this manner, mutual positional relation between the transmitting lever 40 and the striker-holding lever 50 is determined by the lever-shaft member 22 and the moving and connecting pin 62.

As shown in FIG. 4A, the striker S held by the striker-holding lever 50 is located at a standby position P1 in a normal state when the actuator 30 performs a standby action, and the gear 32 is engaged with an upper portion of the engaging portion 43 of the transmitting lever 40.

In an exemplary operation of the closer 20 having the above structure, the trunk lid 2 that is in an opened state as shown in FIG. 1 is closed. At that time, the striker-entering groove 11c of the latch mechanism 10 is opened as shown in FIG. 3.

If the striker S enters the striker-entering groove 11c of the latch mechanism 10 of the closing trunk lid 2, the striker S abuts on the latch 12 and the latch 12 swings around the axis of the latch shaft member 12a in the counterclockwise direction. As a result, as shown in FIG. 2, the tip end 12b of the latch 12 closes the striker-entering groove 11c, and the striker S is held in a state in which the striker S is contacted with the holding section 12c of the latch 12. That is, the striker S and the latch mechanism 10 are engaged with each other. At that time, an edge portion 121 of the latch-contact section 12d is engaged with the ratchet-engaging section 13b so that the latch 12 maintains the closing state of the striker-entering groove 11c.

Figure 5:
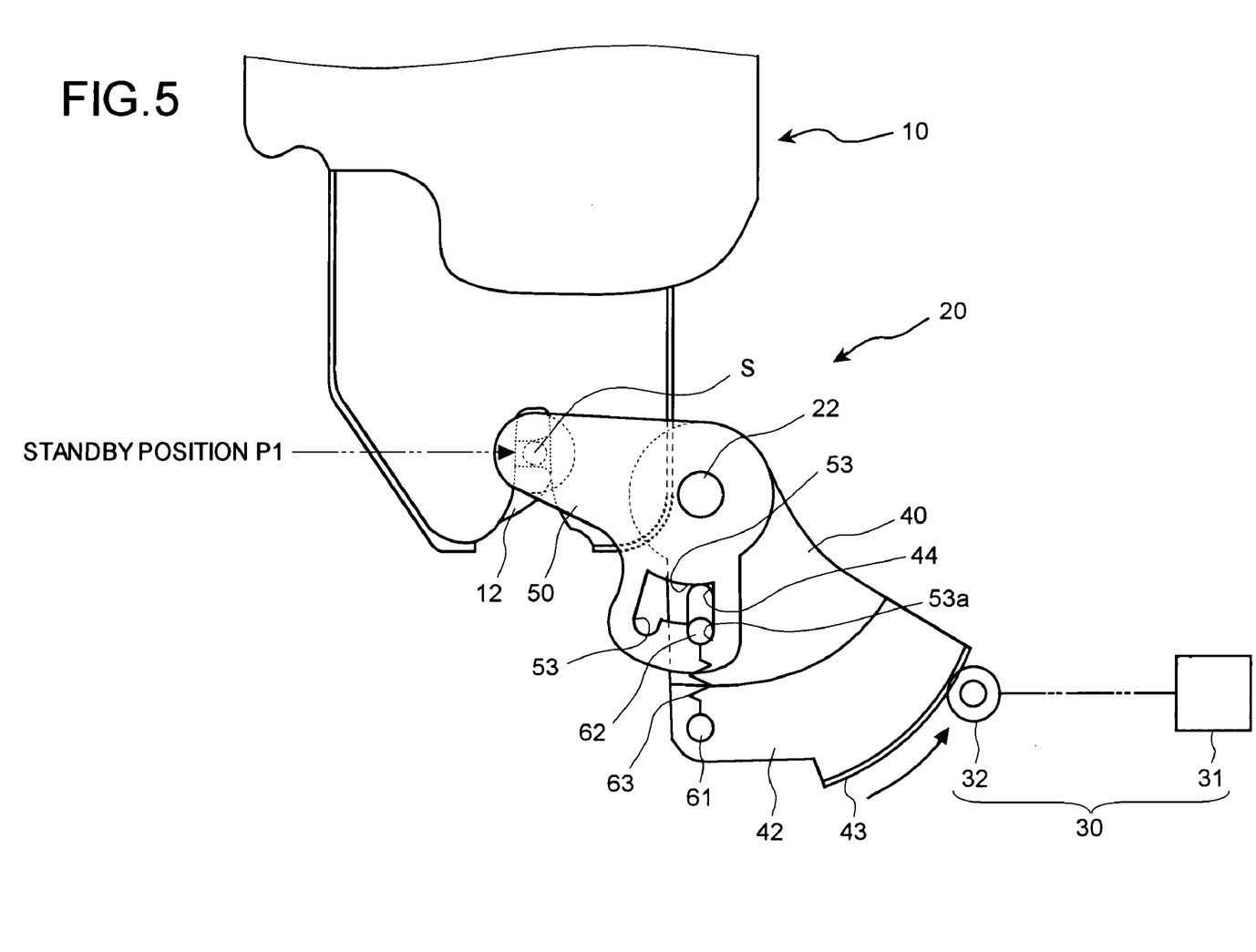
FIG. 5 is a schematic diagram of the closer when a striker is engaged with a latch mechanism in a standby position.

When the actuator 30 performs the standby action and the striker S is located at the standby position P1 and the striker S is engaged with the latch mechanism 10 in the standby position P1, the closer 20 is in a state as shown in FIG. 5. Here, the standby action of the actuator 30 means an action to locate the striker S in the standby position P1. More specifically, the standby action is an action to rotate the gear 32 in the clockwise direction to locate the striker S in the standby position P1 through the transmitting lever 40 and the striker-holding lever 50. If the switch 14 detects that the latch 12 is its closed state, the motor 31 of the actuator 30 is driven, i.e., the actuator 30 performs the closing action. If the motor 31 is driven, the gear 32, which is operated in association with the motor 31, rotates in the counterclockwise direction as viewed in the drawing. As a result, transmitting lever 40 that is engaged with the gear 32 swings in a direction of an arrow in FIG. 5.

Figure 6:
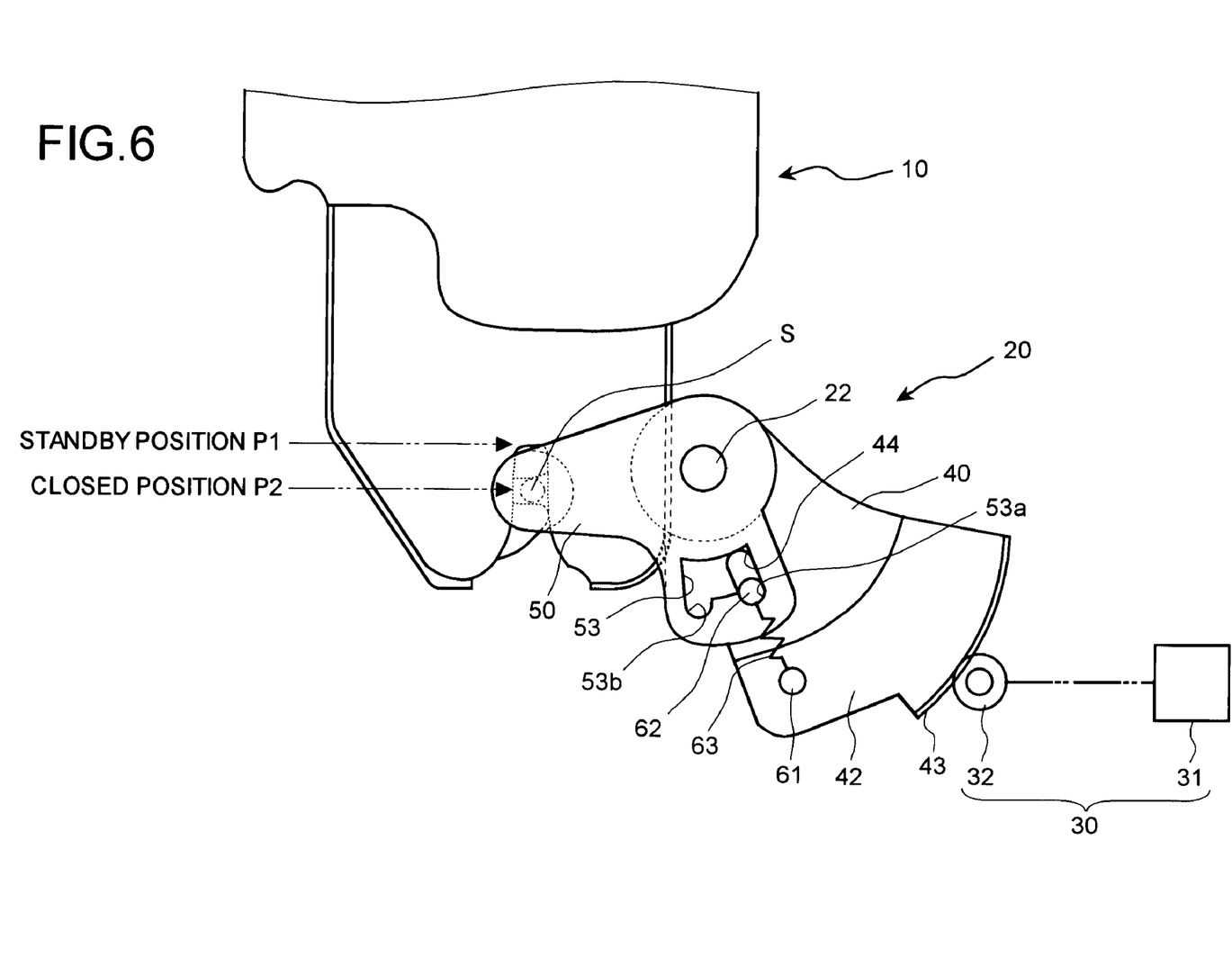
FIG. 6 is a schematic diagram of the closer when the striker is moved from the standby position to a closed position.

The striker-holding lever 50 also moves in the same manner in accordance with the swinging motion of the transmitting lever 40. As a result, as shown in FIG. 6, the striker S held by the striker-holding lever 50 moves to a predetermined closed position P2. Then, the trunk lid 2 is brought into a fully closed state through the latch mechanism 10 that is engaged with the striker S.

In order to open the trunk lid 2 that is in this fully closed state, the closer 20 performs the following operation.

If an operation lever adjacent to a driver's seat in the vehicle 1 or an operating section provided on the trunk lid 2 is operated, the wire 17 is pulled and the release-lever 15 swings in the counterclockwise direction. With this operation, the tip end 15a of the release-lever 15 pushes the trigger section 13d which abuts on the tip end 15a so that the ratchet 13 swings in the clockwise direction. With this operation, the engagement between the ratchet-engaging section 13b and the edge portion 121 of the latch-contact section 12d of the latch 12 is released, and the latch 12 is biased by the latch-extension coil spring 16 and retracts to bring the striker-entering groove 11c into its opened state (see FIG. 6). At that time, an end edge 122 of the latch-contact section 12d of the latch 12 comes into contact with the ratchet-contact section 13c of the ratchet 13, and the opened state is maintained. The trunk lid 2 is opened by repulsion generated when the holding section 12c of the retracting latch 12 abuts on the striker S or resilience of the weather strip mounted on the rim of the trunk room opening 3.

If the switch 14 detects that the striker-entering groove 11c of the latch mechanism 10 is in its opened state, the actuator 30 performs the standby action and the gear 32 rotates in the clockwise direction that is opposite from the previous direction, and the closer 20 moves the striker S from the closed position P2 to the standby position P1 through the transmitting lever 40 and the striker-holding lever 30.

Figure 7:
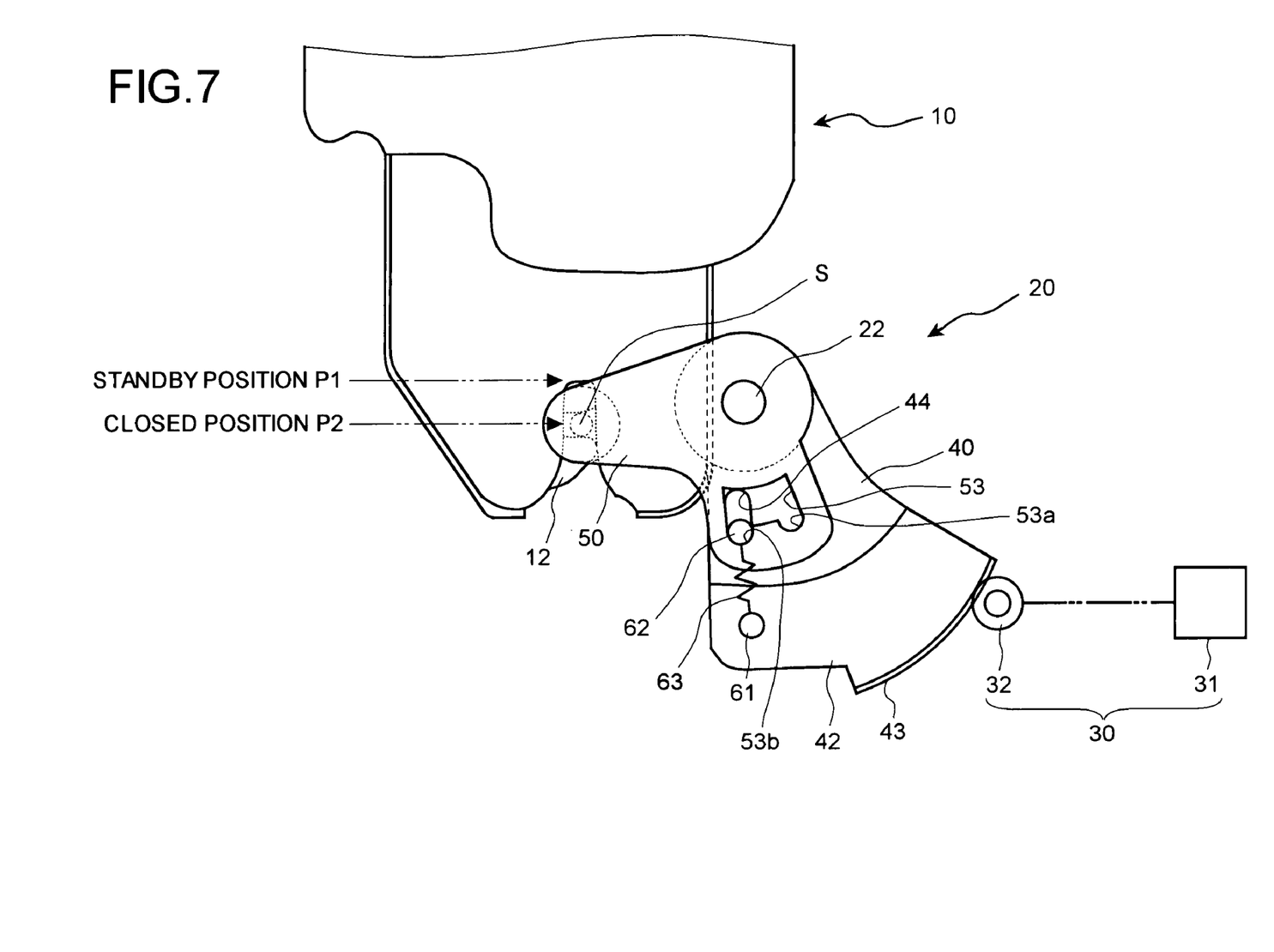
FIG. 7 is a schematic diagram of the closer in a troubled state.

Next, the operation of the closer 20 in an abnormal state will be explained. The abnormal state includes a case in which the actuator 30 is out of order and is not driven, i.e., the actuator 30 remains in its standby state and does not perform the closing operation. The closer 20 in such an abnormal state cannot move the striker S from the standby position P1 to the closed position P2, and the striker S remains in the standby state at the standby position P1. Therefore, even if the trunk lid 2 is closed and brings the striker S in the standby position P1 and the latch mechanism 10 interlock each other, it is not possible to fully close the trunk lid 2. Hence, after the trunk lid 2 is once opened, the moving and connecting pin 62 which is engaged with the first recess 53a of the positioning hole 53 of the striker-holding lever 50 is moved as shown in FIG. 7, and the moving and connecting pin 62 is engaged with the second recess 53b. With this operation, the positional relation between the transmitting lever 40 and the striker-holding lever 50 is changed, and the striker S stands by irrespective of the transmitting lever 40, in other words, the striker S stands by the closed position P2 even if the actuator 30 is on standby. Therefore, if the trunk lid 2 is closed in this state, the trunk lid 2 is engaged with the latch mechanism 10 that is closed at the closed position P2, and the trunk lid 2 can be fully closed.

According to the closer 20 having such a structure, when the actuator 30 becomes out of order and the striker S cannot move from the standby position P1 to the closed position P2, since the moving and connecting pin 62 can be engaged with the second recess 53b and the striker S can be located at the closed position P2, it is possible to fully close the trunk lid 2. Therefore, there is no chance that raindrops or the like leak into the trunk room.

Since the first recess 53a and the second recess 53b are continuously formed, it is possible to move the moving and connecting pin 62 from the first recess 53a to the second recess 53b only by expanding the connection-extension coil spring 63 without removing the moving and connecting pin 62, and the striker S can be easily located at the closed position P2.

Although the exemplary embodiments have been explained above, the present invention is not limited to the embodiment. Although the example of the door is the trunk lid 2 in the above embodiments, the door may be a sliding door for a vehicle, and the closer may be for the sliding door. Although the moving and connecting pin 62 is connected to the fixing and connecting pin 61 in the embodiment, they may be separated in the present invention.

As explained above, according to one aspect of the invention, in a state that the switching operation is performed, the switching unit permits the striker to move to the closed position even if the driving unit performs the standby action, while the switching unit holds the striker in the standby position when the driving unit performs the standby action in a normal state. Therefore, even if the driving unit becomes out of order, it is possible to fully close the closing door.

Moreover, the first recess and the second recess forming a control unit are continuously arranged, it is possible to move the shaft from the first recess to the second recess without removing the shaft, and the striker can be easily located at the closed position.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A door closer for a vehicle comprising:
   a striker provided on one of a body and a door of the vehicle;
   a latch mechanism provided on other of the body and the door;
   a driving unit that performs a standby action to locate the striker at a standby position, and when the striker is engaged with the latch mechanism, performs a closing action to move the striker to a closed position, thereby closing the door; and
   a switching unit that is provided between the driving unit and the striker, wherein when the driving unit performs the standby action in a normal state, the switching unit holds the striker at the standby position, and with a switching operation performed, the switching unit allows the striker to move to the closed position even when the driving unit cannot move from the standby position to the closed position,
   wherein the control unit includes
   a first recess defining said first position of said striker and a second recess defining said second position of said striker, wherein the first recess and the second recess are continuously formed on one of the transmitting member and the striker-holding member; and
   a shaft that is provided on other of the transmitting member and the striker-holding member, and moves into either of the first recess and the second recess to selectively engage with either of the first recess and the second recess,
   wherein the switching unit includes
   a transmitting member that is linked with the driving unit;
   a striker-holding member that holds the striker, wherein the striker-holding member is movably arranged with respect to the transmitting member, and when the driving unit performs the standby action, moves the striker between the standby position and the closed position, said striker holding member being moveable with respect to said transmitting member between a first position in which said driving unit is operative to perform said closing action and a second position in which said driving unit is inoperative but said striker is in said closed position; and
   a control unit which controls a movement of the striker-holding member with respect to the transmitting member,
   wherein the shaft is engaged with either of the first recess and the second recess, in a state being connected by a spring.

2. A door closer for a vehicle comprising:
a striker provided on one of a body and a door of the vehicle;
a latch mechanism provided on other of the body and the door;
a driving unit that performs a standby action to locate the striker at a standby position, and when the striker is engaged with the latch mechanism, performs a closing action to move the striker to a closed position, thereby closing the door; and
a switching unit that is provided between the driving unit and the striker, wherein when the driving unit performs the standby action in a normal state, the switching unit holds the striker at the standby position, and with a switching operation performed, the switching unit allows the striker to move to the closed position even when the driving unit cannot move from the standby position to the closed position,
wherein the switching unit includes
a transmitting member that is linked with the driving unit;
a striker-holding member that holds the striker, wherein the striker-holding member is movably arranged with respect to the transmitting member, and when the driving unit performs the standby action, moves the striker between the standby position and the closed position, said striker holding member being moveable with respect to said transmitting member between a first position in which said driving unit is operative to perform said closing action and a second position in which said driving unit is inoperative but said striker is in said closed position; and
a control unit which controls a movement of the striker-holding member with respect to the transmitting member,
wherein the striker holding member and transmitting member are rotatable about a common axis.

* * * * *